US009197558B2

(12) United States Patent
Allan et al.

(10) Patent No.: US 9,197,558 B2
(45) Date of Patent: Nov. 24, 2015

(54) LOAD BALANCING IN SHORTEST-PATH-BRIDGING NETWORKS

(71) Applicant: TELEFONAKTIEBOLAGET L M ERICSSON (PUBL), Stockholm (SE)

(72) Inventors: David Ian Allan, San Jose, CA (US); Scott Andrew Mansfield, Evans City, PA (US); Eric Ward Gray, Pitman, NJ (US); János Farkas, Kecskemét (HU)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/177,847

(22) Filed: Feb. 11, 2014

(65) Prior Publication Data

US 2014/0153403 A1   Jun. 5, 2014

Related U.S. Application Data

(63) Continuation of application No. 13/097,336, filed on Apr. 29, 2011, now Pat. No. 8,711,703.

(60) Provisional application No. 61/408,037, filed on Oct. 29, 2010, provisional application No. 61/430,281, filed on Jan. 6, 2011.

(51) Int. Cl.
*H04L 12/28* (2006.01)
*H04L 12/741* (2013.01)
(Continued)

(52) U.S. Cl.
CPC ............ *H04L 45/74* (2013.01); *H04L 12/4625* (2013.01); *H04L 45/12* (2013.01);
(Continued)

(58) Field of Classification Search
CPC ........ H04L 45/22; H04L 45/74; H04L 47/125
USPC ......................................................... 370/238
See application file for complete search history.

(56) References Cited

U.S. PATENT DOCUMENTS 6,262,985 B1   7/2001   Huang et al.
8,139,492 B1 *  3/2012   Peterson et al. ............. 370/238
(Continued)

FOREIGN PATENT DOCUMENTS

CN   1564547 A   1/2005
EP   2276207 A1   1/2011
(Continued)

OTHER PUBLICATIONS

Allan, D., et al. "Provider Link State Bridging", IEEE Communications Magazine, IEEE Service Center, Piscataway, US, vol. 46, No. 9, Sep. 1, 2005.
(Continued)

*Primary Examiner* — Farah Faroul

(57) ABSTRACT

A flow classification process is used at the edge of the shortest path bridging network to determine a flow label for attachment to a client frame entering the network. Any of several flow labels can be assigned to a client frame traversing the network to a particular egress node, and the flow labels are used by forwarding nodes to select among multiple equal-cost paths. In several embodiments, the flow label is calculated as a function of the client frame contents, which provide an entropy source for randomizing the selection of the flow label. This entropy source comprises the Internet Protocol (IP) header in the client frame, in some embodiments, but may comprise other client frame content in other cases.

10 Claims, 6 Drawing Sheets

(51) Int. Cl.
 *H04L 12/46* (2006.01)
 *H04L 12/721* (2013.01)
 *H04L 12/803* (2013.01)
 *H04L 12/733* (2013.01)
 H04L 12/727 (2013.01)
 H04L 12/851 (2013.01)

(52) U.S. Cl.
 CPC ............. *H04L 45/122* (2013.01); *H04L 45/38* (2013.01); *H04L 47/125* (2013.01); *H04L 45/121* (2013.01); *H04L 45/123* (2013.01); *H04L 45/745* (2013.01); *H04L 47/2483* (2013.01)

(56) References Cited

U.S. PATENT DOCUMENTS

| | | | |
|---|---|---|---|
| 8,243,594 B1* | 8/2012 | Fotedar et al. | ................ 370/229 |
| 8,244,909 B1 | 8/2012 | Hanson et al. | |
| 8,351,329 B2 | 1/2013 | Pignataro et al. | |
| 8,391,139 B2 | 3/2013 | Matthews et al. | |
| 8,553,584 B2 | 10/2013 | Allan et al. | |
| 8,565,115 B2 | 10/2013 | Tanaka et al. | |
| 8,711,863 B2* | 4/2014 | Allan et al. | .............. 370/395.53 |
| 2005/0135416 A1 | 6/2005 | Ketchum et al. | |
| 2005/0276263 A1 | 12/2005 | Suetsugu et al. | |
| 2008/0037544 A1 | 2/2008 | Yano et al. | |
| 2009/0304007 A1 | 12/2009 | Tanaka et al. | |
| 2011/0013639 A1 | 1/2011 | Matthews et al. | |
| 2011/0051602 A1 | 3/2011 | Matthews et al. | |
| 2011/0283013 A1* | 11/2011 | Grosser et al. | ................ 709/232 |
| 2012/0039161 A1* | 2/2012 | Allan et al. | .................... 370/216 |
| 2012/0063314 A1 | 3/2012 | Pignataro et al. | |
| 2012/0243539 A1* | 9/2012 | Keesara | ........................ 370/392 |
| 2013/0208718 A1* | 8/2013 | Ashwood-Smith | ........... 370/389 |
| 2013/0230010 A1 | 9/2013 | Kim et al. | |
| 2014/0241247 A1* | 8/2014 | Kempf et al. | ................. 370/328 |

FOREIGN PATENT DOCUMENTS

JP  A-2009-510953  3/2009
WO  WO 2007/038856 A1  4/2007

OTHER PUBLICATIONS

Fedyk D., et al.: IS-IS Extensions Supporting IEEE 802.1aq Shortest Path Bridging; (draft-ietf-isis-ieee-aq-01.txt); IS-IS Extensions Supporting IEEE S02.1AQ Shortest Path Bridging; DRAFT-IETF-ISIS-IEEE-AQ-01.TXT, Internet Engineering Task Force, IETF, Standard Working Draft, Internet Society (ISOC) 4, Rue Des Falaises CH-1205 Geneva, Switzerland, No. 1, Oct. 25, 2010.

\* cited by examiner

LOAD BALANCING IN SHORTEST-PATH-BRIDGING NETWORKS

RELATED APPLICATIONS

This application claims priority under 35 U.S.C. §119(e) to Provisional Patent Application Ser. No. 61/408,037, filed Oct. 29, 2010, and to Provisional Patent Application Ser. No. 61/430,281, filed Jan. 6, 2011, and is a Continuation of U.S. patent application Ser. No. 13/097,336, filed Apr. 29, 2011. The entire contents of each of the aforementioned applications are incorporated herein by reference.

BACKGROUND

The present invention relates generally to data communications networks, and in particular to techniques for facilitating load balancing in a data packet network backbone that utilizes shortest path bridging.

Load distribution or load spreading is a method by which data communications bandwidth is more effectively utilized and overall performance is improved in a network. More particularly, equal-cost multi-path (ECMP) is one common strategy for load spreading of unicast traffic in routed networks. ECMP can be utilized where the decision as to how to forward a packet to a given destination can resolve to any of multiple "equal-cost" paths, each of which tied for being the shortest (or lowest cost) path when running network traversal calculations. ECMP can be used in conjunction with most unicast routing protocols and nodes equipped with the required supporting data plane hardware, since it relies on a per-hop decision that is local to a single router and assumes promiscuous receipt and a complete forwarding table at every intermediate node. When ECMP is used at a given node in a network, the traffic from that node is divided pseudo-evenly across the set of equal-cost next hops. This process is implemented independently at each hop of the network where more than one path to a given destination exists.

In many implementations, at each point where the presence of multiple equal-cost next hops is encountered, each packet is inspected for a source of entropy, such as an Internet Protocol (IP) header, and a hash of header information is used to select the next hop for the particular packet. For highly aggregated traffic, this method will on average distribute the load evenly in regular topologies (i.e., symmetric topologies) and does offer some improvement in less regular topologies.

The Institute of Electrical and Electronics Engineers (IEEE) 802.1aq standard for shortest path bridging (SPB) has been developed to allow the construction of full-mesh, shortest-path connectivity in an Ethernet network architecture. SPB consolidates a number of control protocols into a single link state routing system supported by the intermediate system to intermediate system (IS-IS) protocol. This system is used for the computation of integrated and congruent unicast and multi-cast forwarding to construct basic Ethernet LAN connectivity.

Ethernet network architectures, including those supporting 802.1aq, do not support the per-hop multi-path forwarding approach discussed above. This lack of support is a consequence of the need for congruence between unicast and multicast traffic and because multicast is generally incompatible with ECMP. Accordingly, improved techniques for load balancing in Ethernet networks supporting SPB are needed.

SUMMARY

In several embodiments of the invention, a flow classification process is used at the edge of the shortest path bridging network to determine a flow label for attachment to a client frame entering the network. Because any of several flow labels can be assigned to a client frame traversing the network to a particular egress node, the flow labels can be used by forwarding nodes to select among multiple equal-cost paths. In several embodiments, the flow label is calculated as a function of the client frame contents, which provide an entropy source for randomizing the selection of the flow label. This entropy source comprises the Internet Protocol (IP) header in the client frame, in some embodiments, but may comprise other client frame content in other cases, such as the frame's destination-MAC address and source-MAC address. In some embodiments, an IP header is used as an entropy source when it is available, and a destination-MAC address/source-MAC address pair used otherwise.

In some embodiments of the techniques disclosed herein, the forwarding process is similar to conventional Ethernet routing, involving a lookup of a next-hop interface in a forwarding database indexed by the destination address and the flow label. In a variant of this approach, the forwarding database comprises destination addresses paired with corresponding sets of next-hop interfaces, and the forwarding process includes the selection of one of the next-hop interfaces using a calculation based on the flow label and, in some embodiments, based further on a node-specific seed value.

One example method for facilitating load balancing in a data packet network backbone that utilizes shortest path bridging begins with the receipt of one or more client frames at an ingress node of the network backbone. A flow offset value is calculated for each client frame as a function of the contents of the client frame; this flow offset value is one of N predetermined values, where N defines a maximum number of possible paths from the ingress node to a destination-MAC address for the client frame. The method continues with the attaching of a backbone virtual LAN identifier (B-VID) to each client frame, wherein the B-VID is a function of a predetermined B-VID base value and the flow offset value for the client frame. The client frame is then forwarded according to the B-VID and the backbone destination-MAC address for the client frame.

In some cases, the flow offset value is generated as a function of an Internet Protocol header in the client frame. For example, the flow offset value may be generated by calculating a hash of the Internet Protocol header and mapping the calculated hash to one of the N predetermined values. In some embodiments, this mapping may comprise computing the flow offset value as the modulo remainder of the hash divided by N, and wherein the B-VID is the sum of the predetermined B-VID base value and the flow offset value.

In other cases, the flow offset value may be generated as a function of a source-MAC address for the client frame and either a client destination MAC-address or the backbone destination-MAC address for the client frame. In still other cases, the method may further include first determining whether an Internet Protocol header is present in the client frame, and generating the flow offset value as a function of the Internet Protocol header, if present, and otherwise generating the flow offset value as a function of the destination-MAC address and a source-MAC address for the client frame, if no IP header is present.

Another example method is directed to techniques for populating a forwarding database in a network node. According to this method, the number of equal-cost next hops corresponding to a backbone destination-MAC address is determined. Each backbone virtual LAN identifier (B-VID) from a predetermined set of B-VIDs is mapped to a next-hop interface, as a function of the B-VID and the number of equal-cost next hops. Finally, a forwarding database is populated with entries corresponding to each combination of backbone destination-MAC address and B-VID, the entries comprising identifiers for the next-hop interfaces mapped to the B-VIDs. This process may be repeated for each of the backbone destination addresses known to the network node.

In some embodiments, the predetermined set of B-VIDs is a predetermined range of B-VIDs. In these embodiments, each B-VID may be mapped to a next-hop interface by subtracting a predetermined B-VID base value from the B-VID, to obtain a flow offset value, calculating an interface offset value as the flow offset value modulo the number of equal-cost next hops, and mapping the B-VID to the next-hop interface corresponding to the interface offset value. In other embodiments, the predetermined set of B-VIDs includes a plurality of B-VID ranges, and each B-VID range is mapped to one of the next-hop interfaces.

In another variant of the methods summarized above for populating a forwarding database in a network node, a set of equal-cost next hops is determined for each destination-MAC address, and the forwarding database is populated with entries mapping the backbone destination-MAC address to identifiers for each of the equal-cost next hops in the corresponding set. When this technique for populating a forwarding database is used, a forwarding node uses a modified technique for forwarding frames. More particularly, the forwarding node receives a data frame labeled with a backbone virtual LAN identifier (B-VID) and a destination-MAC address, and selects next-hop identifier from the set of equal-cost next-hop identifiers stored in the forwarding database in association with the destination-MAC address, as a function of the B-VID. The node then forwards the data frame via the next-hop interface corresponding to the selected next-hop identifier. In some of these embodiments, the node selects the next-hop identifier by computing a pseudorandom number as a function of the B-VID and a node-specific seed value, and selects the next-hop identifier from the set of equal-cost next-hop identifiers as a function of this pseudorandom number.

In addition to the methods summarized below, several variants are disclosed and described in further detail in the following detailed description. Network nodes configured to carry out one or more of these methods are also described. Thus, the present invention is not limited to the above features and advantages. Indeed, those skilled in the art will recognize additional features and advantages upon reading the following detailed description, and upon viewing the accompanying drawings.

DETAILED DESCRIPTION

It should be understood that the following description, while indicating several embodiments of the invention, is given by way of illustration only. Various changes and modifications within the scope of the invention as claimed will become apparent to those skilled in the art upon reading the following description and viewing the attached drawings.

The IEEE has developed the 802.1aq standards for Shortest Path Bridging to provide logical Ethernet networks on native Ethernet infrastructure. 802.1aq-enabled nodes (SPB-capable bridges) use the Intermediate System to Intermediate System (IS-IS) link state protocol to advertise network topology and membership in logical networks. This well-understood routing protocol allows nodes in the network to determine the shortest path between nodes automatically. Effectively, each bridge advertises the nodes it knows about to all the other nodes, so that all the bridges in the network eventually have a similar view of the network. Each node can then calculate the shortest (lowest cost) route to a target node and forward frames to the next hop in that shortest path.

The 802.1aq standards describe two variants of SPB. SPBV (Shortest Path Bridging-VID) is backwards compatible with Spanning Tree Protocols (STP), using the "region" concept of the Multiple Spanning Tree Protocol (MSTP), and is generally suitable for small Virtual Local-Area Networks (VLANs) having fewer than one hundred bridges. The other variant, known as SPBM (Shortest Path Bridging-MAC) is designed for carrier-grade applications, including large Provider Backbone Bridge (PBB) networks having as many as one thousand bridges.

In an SPBM network, unicast frames received at the edge of the network from an attached Ethernet device are encapsulated in mac-in-mac IEEE 802.1ah header, which is used by core bridges for forwarding the frame across the network. When the frame egresses the SPBM network at the far side, the IEEE 802.1ah header is stripped off. Source learning of Client MAC (C-MAC) addresses in a logical network is performed at the edge of the network, so that frames are forwarded to the backbone MAC (B-MAC) address for the egress node closest to the destination client. The B-MAC addresses for the SPB bridges are distributed and/or algorithmically constructed by the control plane, eliminating the need for B-MAC learning. SPBM supports unicast and multicast, with all routing on symmetric shortest paths, and support is provided for many equal-cost shortest paths.

Figure 1:
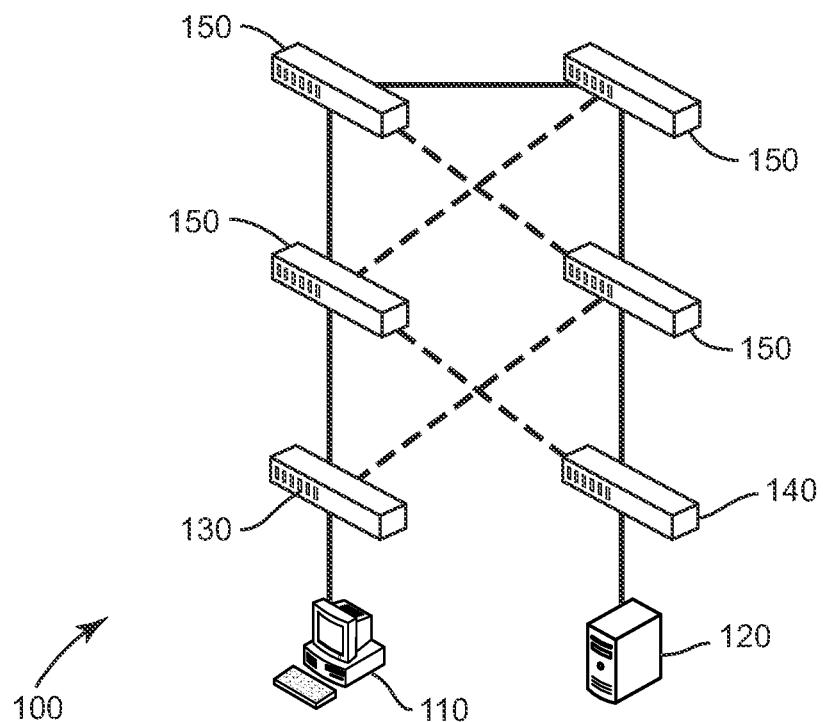
FIG. 1 illustrates a network using spanning tree to avoid loops.
Figure 2:
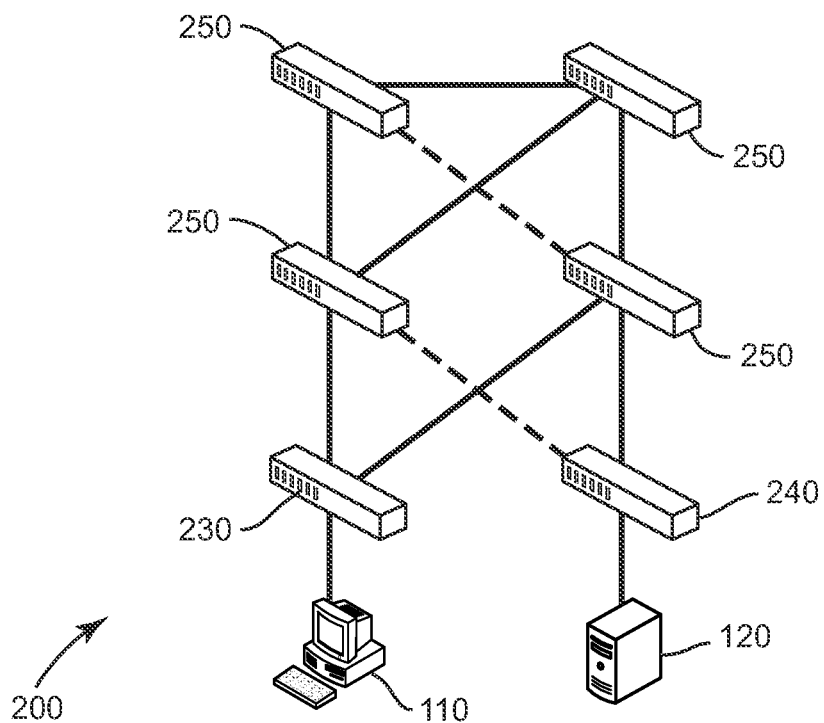
FIG. 2 illustrates a network using shortest path bridging.

FIGS. 1 and 2 illustrate one of the key advantages of SPB. FIG. 1 depicts a simple, three-tier network 100 that relies on SPT to avoid loops in the network. A frame transmitted by client 110 to server 120 enters the network at ingress node 130 and traverses the network to egress node 140, via core network nodes 150, through the solid links, which define a single path traversing all of the network nodes, so that there is only one path from client 110 to server 120 and to any other client node accessible through core network nodes 150. Alternative links between network nodes, shown as dashed lines in FIG. 1, are disabled unless they are needed to replace a broken link.

By contrast, FIG. 2 illustrates a network 200 that utilizes shortest path bridging. Here, a frame transmitted by client 110 to server 120 enters the network at ingress (edge) node 230 but can traverse the network to egress (edge) node 240 in just two hops, rather than the five hops required in network 100. This network is able to utilize all of the links between core network nodes 250, so that a frame traverses the shortest path (lowest cost) route. This alleviates congestion in the network and improves network performance and capacity.

One advantage of shortest path bridging is that mesh networks can be formed to distribute load more evenly across the network topology, since choke points can be eliminated. Redundant links are actually used, rather than sitting idle until a failure. The improved efficiency provides the potential to flatten an existing network, by removing one or more tiers, while maintaining or even improving the network's performance.

On the other hand, an SPB network is more dynamic than conventional Ethernet networks, which complicates traffic management and network troubleshooting. Furthermore, load balancing in a real network can be quite complex. The network 200 illustrated in FIG. 2 is quite simple—In a more complex network, with many more bridges, there may be several (or many) equal-cost paths between ingress node 230 and egress node 240, since all of the available links are usable. Accordingly, efficient and flexible techniques for balancing network traffic over these multiple paths are needed.

One possible approach is to adapt ECMP techniques to SPBM. This could be done in a number of different ways, using any of several sources of entropy for selecting between the available equal-cost paths. One possibility is to hash a combination of the B-MAC addresses (the source-address, B-SA, and destination-address, B-DA) included in the 802.11ah header to provide a source of entropy for selecting among the equal-cost paths. However, this is a relatively poor source of entropy. A somewhat better source of entropy is the I-SID; a still better choice is to hash the C-MAC SNDA information, while perhaps the best choice is to hash the Internet Protocol (IP) 5-tuple, if present. Hop selection based on the hashing of an entropy source can be performed on a per-hop basis, i.e., at each forwarding node, or performed at the edge of the bridging network, in which case some resulting token of information is carried in the data packet to summarize the hash.

A higher entropy source for randomizing data flow across multiple equal-cost forwarding interfaces provides better performance, thus hashing of the IP payload provides the best entropy, especially if the routers are Ethernet connected, since a single source/destination router MAC address pair will originate packets with a large variety of IP 5-tuples. However, per-hop hashing of the IP payload is problematic, for several reasons. First, this approach is a layer violation. Second, this approach is incompatible with the existing Ethernet technology base. Finally, this makes Ethernet Operations, Administration, and Management (OAM) very difficult, if not impossible, as the OAM protocols would need to impersonate IP packets to collect network performance data.

Because of these problems with per-hop hashing, edge-based assignment of flows to an Ethernet layer-specific flow label is a better approach. With this approach, existing OAM protocols can be made to work, layer violations are confined to the edge adaptation function, and minimal changes to the overall technology base are required.

The use of multiple, B-VID identified, ECT sets as currently documented in the 802.1aq standards can be considered one variation of a flow label. However, this technique has limitations with respect to the efficiency of link utilization. Proposed enhancements to ECT set generation apply computational techniques to improve the efficiency of path selection, but the requirement for symmetric congruence of unicast and multicast results in high computational complexity of path selection. The Internet Engineering Task Force's (IETF's) TRILL specifications include a separation of unicast and multicast techniques to permit unicast ECMP as part of its design—TRILL uses spanning trees for multicast in order to reduce computational complexity. IETF's PWE specifications include the concept of an entropy label which can be considered to be a flow label, as do the IPv6 standards.

The inventive techniques disclosed herein are based on an exploration of what can be done with the Ethernet technology base for unicast load spreading if the symmetric congruence is relaxed. Under this relaxation of the conventional congruence requirements, the "go" and "return" paths do no need to be the same. Further, unicast and flooded frames do not need to follow the same routing. As will be seen below, this approach allows for the possibility of simplified computation and simplified tie-breaking rules for routing computations.

To minimize overall changes to existing Ethernet devices, the techniques outlined herein will use the backbone virtual LAN identifier (B-VID) as a unicast flow label, as well as to delineate VIDs used for multicast. More particularly, the B-VID flow label, which is applied to packets at the edge of the SPB network, is similar to an entropy label but is not used for per-hop hashing. Rather, the edge nodes hash a suitable entropy source to produce the B-VID flow label for unicast packets. Core nodes of the SPB network can simply forward packets, using conventional forwarding database (FDB) techniques, based on the B-VID flow label and the destination B-MAC.

Using this approach, a single logical network will use several B-VID flow label values. Accordingly, to implement this approach, a means of agreeing on the number of and range of values of B-VID based flow labels for a logical network is required. Similarly, a mechanism for deciding which B-VIDs are assigned to multicast operation is needed. The existing algorithm negotiation framework for IS-IS hellos defined for 802.1aq can serve as the basis for this mechanism. It should be noted that this mechanism can also use ranges of B-VIDs, as is done in MSTP/SVL (Multiple Spanning Tree Protocol/Shared VLAN Learning) operation.

The nominal dataplane configuration in networks employing this technique is as specified in 802.1aq or 802.1Qay, where all B-VIDs used as flow labels are unblocked on all interfaces. Nodes exchange algorithm and topology information as per existing 802.1aq and IS-IS procedures.

When a node is computing shortest paths, it populates the forwarding database (FDB) so that there is a unique entry for each DA-MAC/B-VID tuple. An example algorithm begins with the assumption of a contiguous range of B-VID values starting from a pre-defined base value. To avoid unnecessarily correlating what is supposed to be a random process, a node may choose to combine a per-node random value with the flow label prior to interface selection. For each unicast flow label B-VID, the node performs modulo arithmetic of the B-VID value (and possibly the per-node random value) by the number of equal-cost next hops. The result identifies the interface (among the equal-cost interfaces) that the destination MAC/B-VID tuple will point to in the FDB. The FDB is populated accordingly. Multicast packets are handled separately, under this approach. Thus, a network may also compute one or more multicast distribution trees and assign each of these to a multicast B-VID, which are distinct from the B-VIDs used for unicast.

Behavior at edge nodes is somewhat more complex. Upon receipt of a client frame, an edge node examines the frame contents to perform a form of "flow classification," which results in a value that, modulo the number of flow labels and with the base value added, selects the flow label to be applied to the packet as part of SPBM adaptation. Core nodes receiving the labeled frame will simply look up the B-DA in the FDB and select the next-hop interface as a function of the B-VID flow label and the number of next hops associated with the B-DA forwarding entry.

Those skilled in the art will appreciate that a technique is required to ensure that broadcast segments do not cause duplicate unicast packets. Unless the behavior of forwarding nodes is modified, then every node but the sender attached to a broadcast segment will accept frames broadcast on the segment. There are a few ways this can be handled. First, a key requirement is that for a B-VID/DA tuple there is only one egress from a broadcast segment. One solution is that any node adjacent to a broadcast segment/pseudo-node needs to also compute the Shortest Path First (SPF) tree for the pseudo-node that represents the broadcast segment in the routing system. With this approach, this node can determine whether it is on the shortest path for a DNB-VID tuple from the upstream node, and set up ingress filtering accordingly. Note that if nodes combine a local random value with the flow selection, all nodes attached to the shared segment will need a consistent view of the random value used for the pseudo node. There are numerous well understood techniques by which this can be achieved that are not central to this disclosure.

Figure 3:
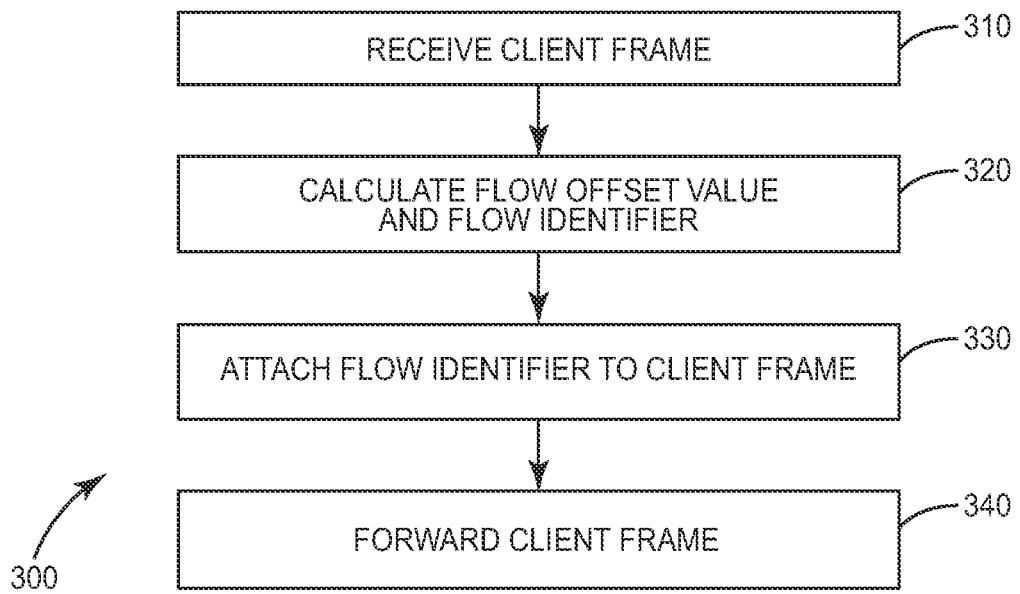
FIG. 3 is a process flow diagram illustrating an example method for attaching flow identifiers to client frames and forwarding them in a shortest path bridging network.

FIG. 3 illustrates a process flow for handling client frames received at an edge node of an SPB network, according to some embodiments of the present invention. Process flow 300 begins, as shown at block 310, with the receipt of a frame from a client network or edge-attached node. As shown at block 320, the edge node calculates a flow offset value and flow identifier; the flow identifier is then attached to the client frame, as shown at block 330, and forwarded, as shown at block 340.

As suggested above, the flow identifier calculation is preferably based on a good source of entropy to best randomize the distribution of packets across multiple equal-cost paths in the SPB network. The flow identifier effectively captures this entropy, and is thus a form of entropy label. However, because the flow identifier already reflects the randomness of the entropy source, the core nodes need not perform complex calculations to forward the packets—rather, the packets can be forwarded using a FDB populated according to the backbone destination address and the flow identifiers.

Figure 4:
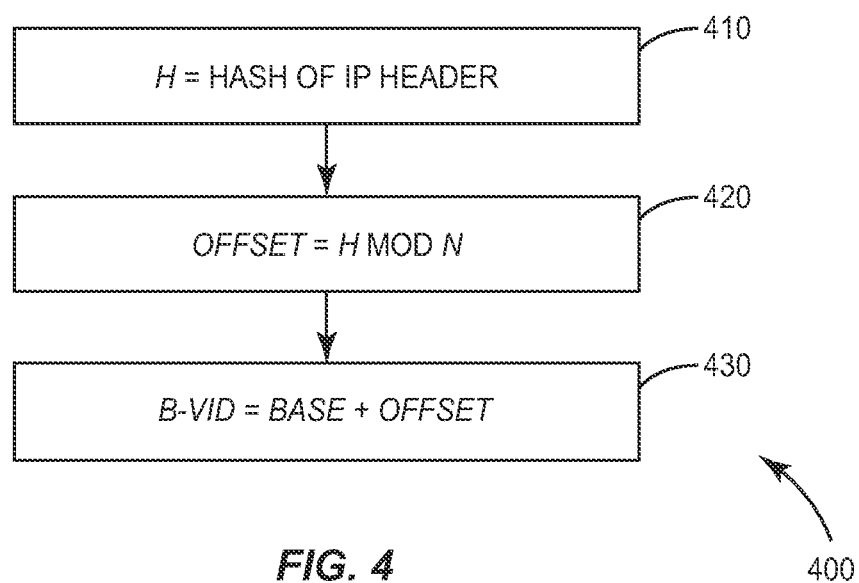
FIG. 4 is a process flow diagram illustrating details of an example calculation of flow labels.

FIG. 4 illustrates a process flow 400 for calculating a flow identifier, for use in some embodiments of the process 300 discussed above. As was noted earlier, the IP header in the client frame is a good source of entropy. Thus, the flow offset value in some embodiments of the invention is generated as a function of the IP header. As shown at block 410, the edge node calculates a hash of the IP header (e.g., the IP 5-tuple)—the result is denominated H in FIG. 4. The hash value H is then mapped to one of N pre-determined values for the flow identifier value, where N defines a maximum number of possible paths from the edge node (the ingress node) to the SPB destination node (the egress node). (It should be noted that N can be an arbitrarily large value). One approach to this mapping is shown at block 420, where an offset value (OFFSET) is calculated as the hash value modulo the number (N) of possible equal-cost paths through the network. Hence:

$$\text{OFFSET} = H \bmod N$$

With this approach, the hash values are evenly divided among the N possible values (zero to N−1) for OFFSET. Finally, as shown at block 430, a flow identifier (B-VID) is calculated by adding the offset value to a pre-determined base flow identifier value (BASE):

$$\text{B-VID} = \text{BASE} + \text{OFFSET}$$

The approach illustrated in FIG. 4 is a straightforward approach based on the assumption that a contiguous set of B-VIDs can be set aside for a given logical network. Within Ethernet standards it is possible to assign a range of B-VID values to an active topology, and have multiple active topologies to a maximum of 64. For instance, logical networks may be assigned B-VID ranges (for unicast purposes) in contiguous groups of sixty-four, allowing for up to sixty-four equal-cost paths (64*64=4096) to be supported for any given ingress/egress pair of nodes in the SPB network within the bounds of existing Ethernet technology. Of course, differently sized groups may be used, and the use of contiguous B-VID identifiers for a group is not strictly necessary, but simplifies the computation of the B-VID values. Such an approach has value in that nodes based on existing technology can be seamlessly combined with nodes able to exceed the 64 path limitation imposed by existing implementations. The existing nodes will not do as good a job of flow randomization as nodes not limited to 64 paths but can still be incorporated into networks in a backwards compatible fashion.

Figure 5:
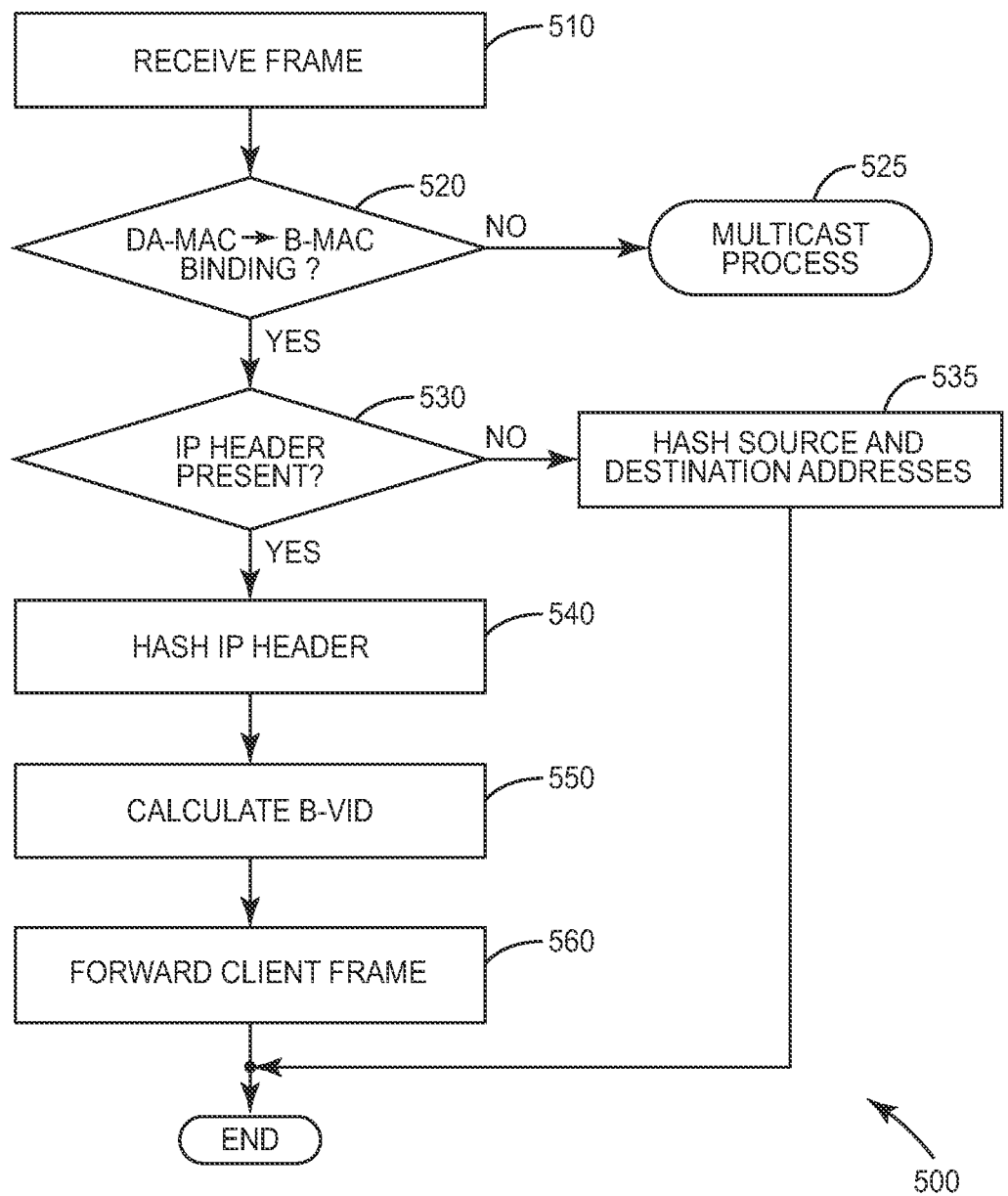
FIG. 5 is a process flow diagram illustrating another example method for attaching flow identifiers to client frames and forwarding them in a shortest path bridging network.

In some cases, the source of entropy used for generating the flow label may vary, depending on what type of packet is being processed. FIG. 5 illustrates a process 500 that operates according to this approach. As shown at block 510, a client frame is first received at an edge node. The edge node first checks to see whether a client-MAC to backbone-MAC binding exists, i.e., whether a destination B-MAC address has been learned for the client-MAC destination address. This is shown at block 520. If the destination B-MAC address is not yet known, then a multicast process is initiated, as indicated at block 525, so that the B-MAC address can be learned.

If the client-MAC to B-MAC binding already exists, however, then the edge node checks to see whether the packet has an IP header, as shown at block 530. If so, then the IP header is hashed, as shown at block 540, and the result used to calculate the B-VID, as indicated at block 550. On the other hand, if no IP header is present, then the edge node instead hashes the B-MAC source and destination addresses, as shown at block 535, and that result is used to calculate the B-VID at block 550. The B-VID may be calculated in the same manner as shown in blocks 420 and 430 of FIG. 4, in some embodiments, or a flow offset derived from the hash function may be mapped to one of N pre-determined B-VID values (or range of values) in some other way. In any case, the B-VID is attached to the client frame, and then forwarded, as shown at block 560.

Figure 6:
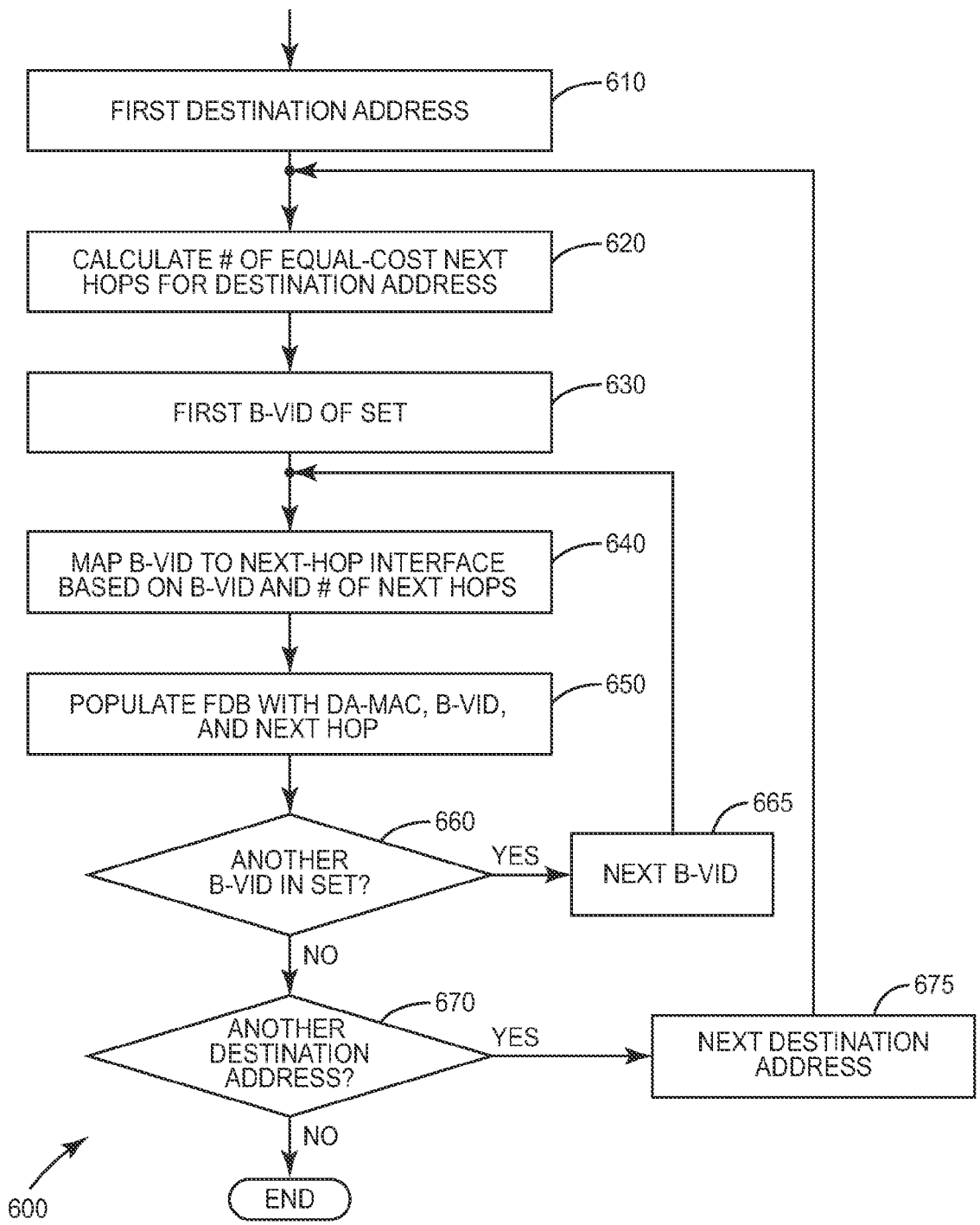
FIG. 6 is a process flow diagram illustrating a method for populating a forwarding database in a network node.

FIG. 6 illustrates a process 600 for populating a forwarding database in a network node in a data packet network backbone that utilizes shortest path bridging, according to some embodiments of the present invention. The illustrated process starts, as shown at block 610, with a first (B-MAC) destination address for a given logical network. Next, the number of different next hops corresponding to equal-cost paths to the destination address is calculated, as shown at block 620. The equal-cost paths can be identified using any appropriate routing metric calculations.

Starting with the first B-VID of a set of B-VIDs assigned to the logical network (block 630), the B-VID is then mapped to one of the next-hop interfaces for the equal-cost paths, based on the B-VID and the number of next hops, as shown at block 640. If the B-VIDs in the set are consecutive values, then one simple way to map each B-VID value to a next-hop interface is to subtract the base B-VID value from the B-VID value, to obtain a flow offset value, calculate an interface offset value as the flow offset value modulo the number of equal-cost next hops, and then use the interface offset value as an index to the next-hop interface, among the next-hop interfaces corresponding to equal-cost paths for the destination address. In mathematical terms:

$$\text{flow\_offset} = \text{BVID} - \text{BVID}_{BASE\_VALUE}; \text{ and}$$

$$\text{next\_hop\_index} = \text{flow\_offset} \bmod n,$$

where n is the number of next-hop interfaces at the node that correspond to an equal-cost path to the destination address, and where the corresponding next-hop interfaces are indexed as next_hop(0) to next_hop(n).

When local randomness is added to the flow offset to reduce the degree of correlation between handling of flows, one example would be:

$$\text{flow\_offset} = \text{BVID} - \text{BVID}_{BASE\_VALUE}; \text{ and}$$

$$\text{next\_hop\_index} = (\text{flow\_offset xor seed\_value}) \bmod n.$$

The forwarding database is populated with the B-MAC destination address (DA-MAC), the B-VID, and an identifier for the next-hop interface, as shown at block 650. If there are more unprocessed B-VIDs in the set of B-VIDs for the current destination address, the process is repeated, as shown at blocks 660 and 665. Then, the process is repeated for each remaining destination address known to the network node, as shown at blocks 670 and 675. When the process is complete, the FDB for a given logical network includes multiple entries for each destination address, with each entry corresponding to one of the B-VIDs allocated for unicast forwarding in the logical network.

Table 1 illustrates an example corresponding to a small portion of an FDB, where there are four interfaces on the router, numbered I_0 to I_3, and where there are eight B-VIDs allocated to unicast forwarding for a given logical network, ranging from B-VID_0 to B-VID_8.

TABLE 1

| Destination MAC | Flow label | Next-hop interface |
|---|---|---|
| B-MAC-DA-a | B-VID0 | I_0 |
|  | B-VID1 | I_3 |
|  | B-VID2 | I_0 |
|  | B-VID3 | I_3 |
|  | B-VID4 | I_0 |
|  | B-VID5 | I_3 |
|  | B-VID6 | I_0 |
|  | B-VID7 | I_3 |
| B-MAC-DA-b | B-VID0 | I_1 |
|  | B-VID1 | I_2 |
|  | B-VID2 | I_1 |
|  | B-VID3 | I_2 |
|  | B-VID4 | I_1 |
|  | B-VID5 | I_2 |
|  | B-VID6 | I_1 |
|  | B-VID7 | I_2 |
| B-MAC-DA-c | B-VID0 | I_0 |
| ... | B-VID1 | I_4 |
| ... | ... | ... |

In this (simplistic) example, there happen to be two next-hop interfaces for each destination address, but the pair of next-hop interfaces differs for each of the three destination addresses shown. Thus, I_0 and I_3 are identifiers for the next-hops for the equal-cost paths to destination address B-MAC-DA-a, while the next-hop identifiers for the equal-cost paths to destination B-MAC-DA-b are I_1 and I_2. For each destination address, the eight available B-VID values are split between the two equal-cost next-hops.

In a variant of the above techniques, one or more of the individual B-VIDs can be replaced with a range of B-VIDs. This approach may be suitable when there are a large number of flow labels available for a given logical network, compared to the maximum number of equal-cost paths that are supported. For example, if there are 4096 available flow labels (B-VIDs), but only 64 possible equal-cost paths, then the B-VIDs could be mapped to next-hop identifiers in "chunks" of 64. Thus, BVID0 in Table 1 might be replaced with a range, e.g., BVID0-BVID63, while BVID1 is replaced with a second range, e.g., BVID64-BVID127.

Given a FDB populated according to the techniques described above and illustrated in FIG. 6 and Table 1, forwarding a B-VID labeled packet is a trivial exercise. The network node that receives the packet simply reads the B-VID and the B-MAC-DA from the packet, looks up the corresponding next-hop interface in the database and sends the packet on its way.

The above techniques for populating the FDB in backbone network nodes is generally compatible with existing Ethernet technology, in that the packet processing is based on a simple look-up and forward approach. Another approach to FDB and packet forwarding, which may require more extensive modifications to network node hardware, is illustrated in FIGS. 7 and 8.

Figure 7:
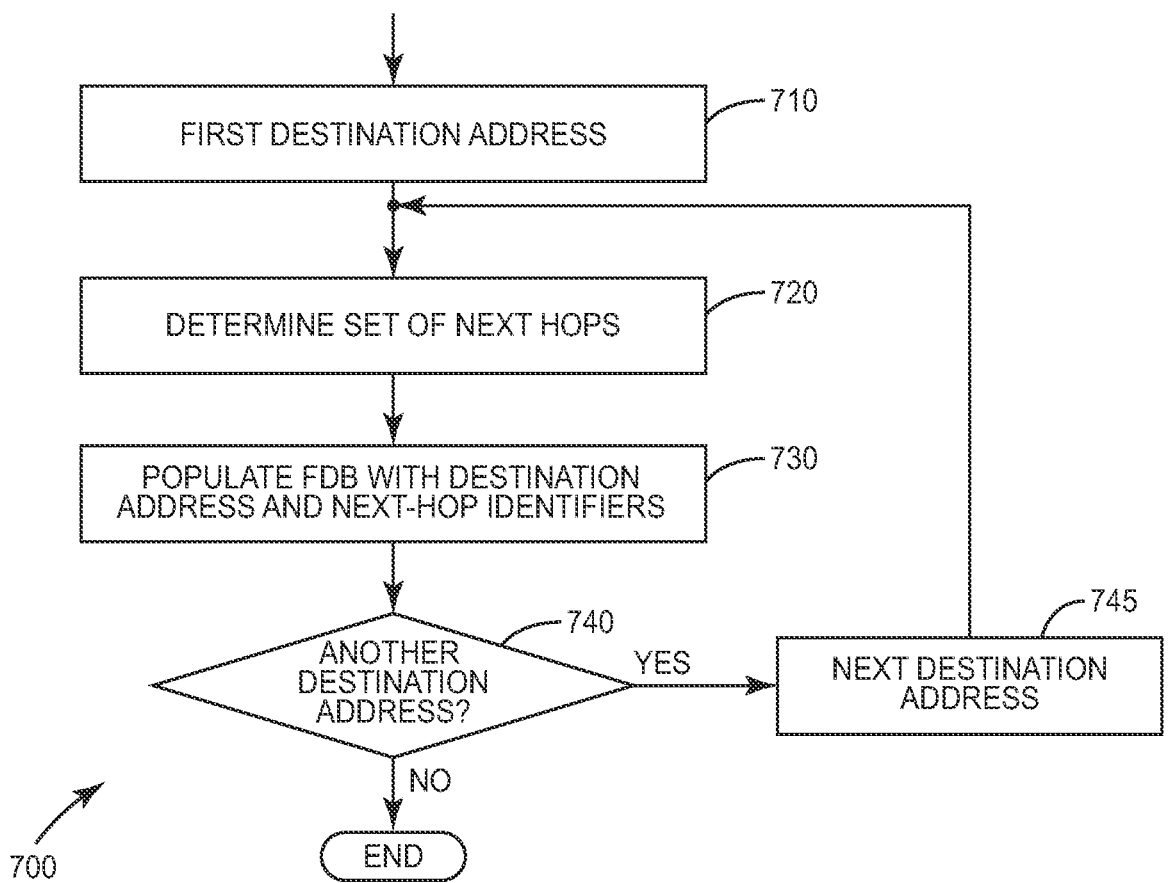
FIG. 7 is a process flow diagram illustrating another method for populating a forwarding database in a network node.
Figure 8:
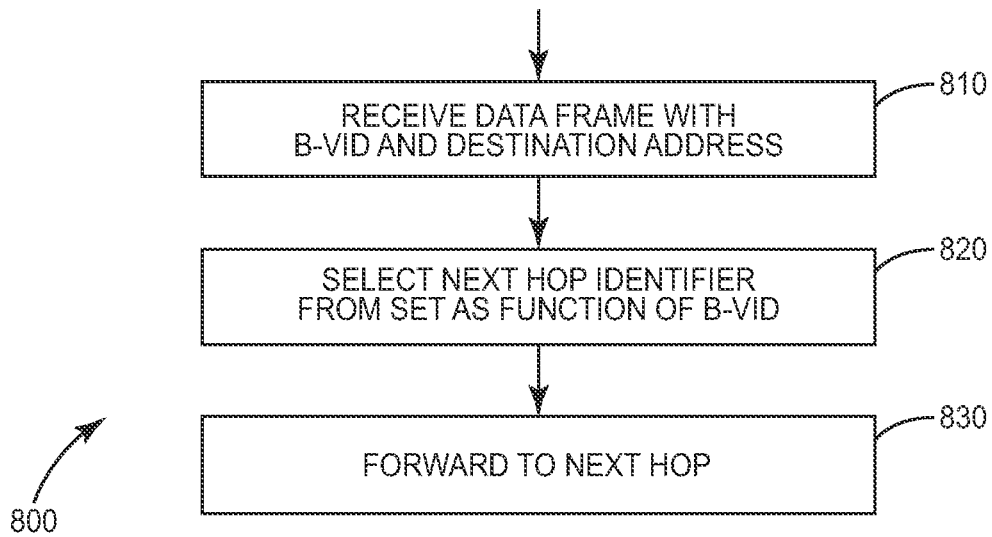
FIG. 8 is a process flow diagram illustrating a method for forwarding data packets in a shortest path bridging network.

FIG. 7 illustrates a process flow 700 according to some embodiments of this more advanced approach, which requires dynamic processing of the flow label. Process flow 700 begins with a first destination address, as shown at block 710, and repeats for each destination address known to the node, as shown at blocks 740 and 745. For each destination address, the node determines the set of next-hop interfaces corresponding to equal-cost paths for the destination address, as shown at block 720. Again, the equal-cost paths and their corresponding interfaces can be identified using conventional routing metric calculations.

As shown at block 730, an FDB is populated with the destination address and the corresponding set of next-hop identifiers. An example of this different type of FDB, corresponding to the same situation illustrated in Table 1, is illustrated in Table 2.

TABLE 2

| Destination MAC | Next-hop interfaces |
|---|---|
| B-MAC-DA-a | I_0, I_3 |
| B-MAC-DA-b | I_1, I_2 |
| B-MAC-DA-c | I_0, I_4 |
| ... | ... |

It will be immediately appreciated that an FDB according to this approach consumes less memory (i.e., represents less state information) than the FDB populated according to the earlier described approach.

A forwarding process 800 corresponding to this type of FDB is illustrated in FIG. 8. As shown at block 810, a forwarding node receives a data frame labeled with a B-VID and a destination address. As shown at block 820, the node then selects a next-hop identifier from the set associated with the destination address, using a mathematical function of the B-VID. The frame is then forwarded, using the interface corresponding to the selected next-hop identifier, as shown in block 830.

In some embodiments, the selection of the next-hop identifier based on the BVID uses a mathematical approach similar to that described above for populating the FDB. Thus, for example, an index can be computed using modulo division of the BVID value by the number of next-hop interfaces, e.g., $$\text{next\_hop\_index} = (\text{BVID} - \text{BVID}_{BASE\_VALUE}) \bmod n$$

where n is the number of next-hop interfaces in the set corresponding to the destination address. However, one advantage to this dynamic processing of the flow label is that randomization of the packet flows through the network can be improved by adding a seed value, such as a node-specific seed value, to the next-hop identification process. Thus, for example, the next-hop interface could be selected using a formula like:

$$\text{next\_hop\_index} = (\text{BVID} - \text{BVID}_{BASE\_VALUE} + \text{seed}) \bmod n,$$

where the value of seed varies from one node to the next, or from time to time, or both.

Figure 9:
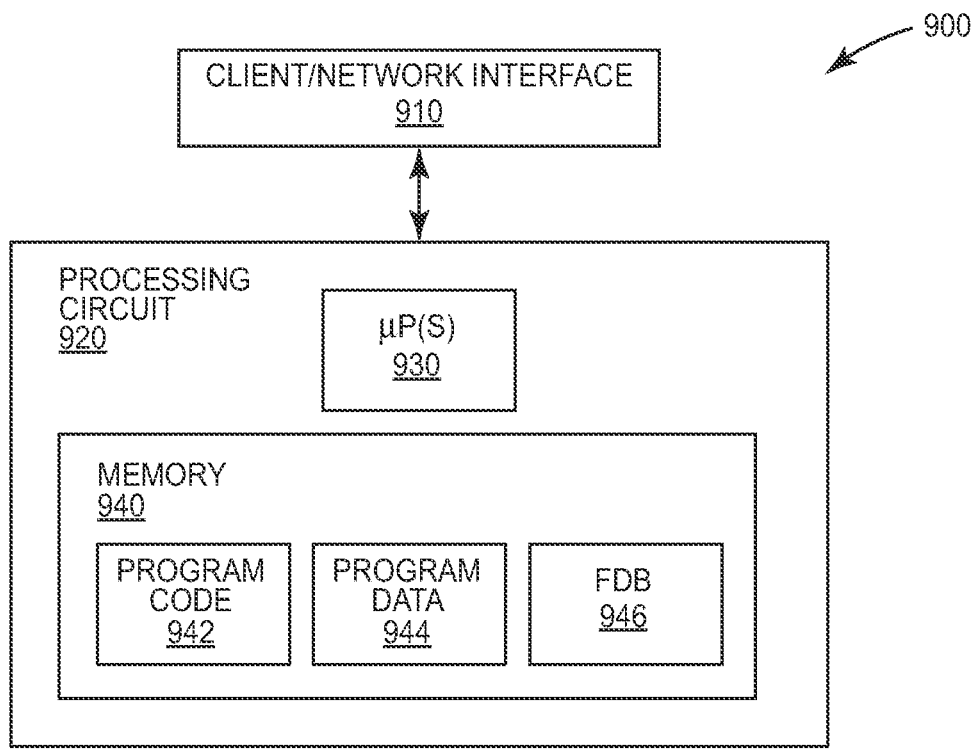
FIG. 9 illustrates components of an example network node configured according to some embodiments of the present invention.

While the above discussion has described certain processes performed at edge nodes, i.e., edge nodes attached to client networks and/or client computers, and at forwarding nodes, which include nodes in the core of an SPB network. Of course, edge nodes may in some cases also be forwarding nodes, so one or several of the techniques may be implemented at a given node. FIG. 9 illustrates the basic features of an example network node that can be configured to carry out any or all of the edge processing, forwarding database population, and forwarding techniques described above. More particularly, network node 900 includes a client/network interface 910—this interface unit comprises the connection point to and from the SPB network and/or to and from one or more client networks or devices, and in particular may comprise conventional interface hardware adapted for connection to an Ethernet network. Network node 900 further comprises a processing circuit 920, which includes one or more microprocessors 930 and memory 940, which in turn includes program code 942, program data 944 and a forwarding database 946. In several embodiments, program code 942 includes program instructions for carrying out one or several of the techniques described above for facilitating load balancing in a data packet network backbone that utilizes shortest path bridging, including the techniques described for attaching flow labels to client frames, for populating the forwarding database 946, and for forwarding frames according to the attached flow label and the destination MAC address for the frame.

More generally speaking, these computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions described herein and illustrated in the accompanying block diagrams and flow diagrams. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions described herein. Several of the functional entities described herein may be implemented together on a single processor or computer, or each may be implemented on separate processors or computers. Those skilled in the art will recognize the advantages and disadvantages of grouping or distributing the functions described herein.

Of course, those skilled in the art will appreciate that the load balancing techniques described above are merely exemplary, and that various modifications and extensions of these procedures are possible. Those skilled in the art will also recognize that the functional aspects of the network node 900 described herein may be deployed in a number of different configurations, depending on the network structures, operator business models, and other factors.

With these and other variations and extensions in mind, those skilled in the art will appreciate that the foregoing description and the accompanying drawings represent non-limiting examples of the systems and apparatus taught herein for facilitating load balancing in a data packet network. As such, the present invention is not limited by the foregoing description and accompanying drawings. Instead, the present invention is limited only by the following claims and their legal equivalents.

What is claimed is:

1. A method at a network node for facilitating load balancing in a data packet network backbone that utilizes shortest path bridging, the method comprising, for each of a plurality of backbone destination-MAC addresses:
    determining the number of equal-cost next hops corresponding to the backbone destination-MAC address;
    mapping each backbone virtual LAN identifier (B-VID) from a predetermined set of B-VIDs to a next-hop interface, as a function of the B-VID and the number of equal-cost next hops; and
    populating a forwarding database with entries corresponding to each combination of backbone destination-MAC address and B-VID, the entries comprising identifiers for the next-hop interfaces mapped to the B-VIDs.

2. The method of claim 1, wherein the predetermined set of B-VIDs comprises a predetermined range of B-VIDs and wherein mapping each B-VID to a next-hop interface comprises:
    subtracting a predetermined B-VID base value from the B-VID, to obtain a flow offset value;
    calculating an interface offset value as the flow offset value modulo the number of equal-cost next hops; and
    mapping the B-VID to the next-hop interface corresponding to the interface offset value.

3. The method of claim 2, wherein the predetermined set of B-VIDs comprises a plurality of B-VID ranges, and wherein each B-VID range is mapped to one of the next-hop interfaces.

4. A network node for use in a shortest path bridging network, the network node comprising:
    a network interface unit configured to connect the network node to one or more other nodes in the shortest path bridging network; and
    a processing circuit configured to, for each of a plurality of backbone destination-MAC addresses:
        determine the number of equal-cost next hops corresponding to the backbone destination-MAC address;
        map each backbone virtual LAN identifier (B-VID) from a predetermined set of B-VIDs to a next-hop interface, as a function of the B-VID and the number of equal-cost next hops; and
        populate a forwarding database with entries corresponding to each combination of backbone destination-MAC address and B-VID, the entries comprising identifiers for the next-hop interfaces mapped to the B-VIDs.

5. The network node of claim 4, wherein the predetermined set of B-VIDs comprises a predetermined range of B-VIDs and wherein the processing circuit is configured to map each B-VID to a next-hop interface by:
 subtracting a predetermined B-VID base value from the B-VID, to obtain a flow offset value;
 calculating an interface offset value as the flow offset value modulo the number of equal-cost next hops; and
 mapping the B-VID to the next-hop interface corresponding to the interface offset value.

6. The network node of claim 4, wherein the predetermined set of B-VIDs comprises a plurality of B-VID ranges, and wherein the processing circuit is configured to map each B-VID range to one of the next-hop interfaces.

7. A method for forwarding data frames in a data packet network, the method comprising:
 receiving a data frame labeled with a backbone virtual LAN identifier (B-VID) and a backbone destination-MAC address;
 selecting a next-hop identifier from a set of equal-cost next-hop identifiers stored in association with the backbone destination-MAC address, as a function of the B-VID; and
 forwarding the data frame via the next-hop interface corresponding to the selected next-hop identifier.

8. The method of claim 7, wherein selecting the next-hop identifier comprises computing a pseudorandom number as a function of the B-VID and a node-specific seed value, and selecting the next-hop identifier from the set of equal-cost next-hop identifiers as a function of the pseudorandom number.

9. A network node for use in a shortest path bridging network, the network node comprising:
 a network interface unit configured to connect the network node to one or more other nodes in the shortest path bridging network; and
 a processing circuit configured to:
  receive a data frame labeled with a backbone virtual LAN identifier (B-VID) and a backbone destination-MAC address, via the network interface unit;
  selecting a next-hop identifier from a set of equal-cost next-hop identifiers stored in association with the backbone destination-MAC address, as a function of the B-VID; and
  forwarding the data frame via the next-hop interface corresponding to the selected next-hop identifier.

10. The network node of claim 9, wherein the processing circuit is configured to select the next-hop identifier by computing a pseudorandom number as a function of the B-VID and a node-specific seed value, and selecting the next-hop identifier from the set of equal-cost next-hop identifiers as a function of the pseudorandom number.

* * * * *